US008243753B2

United States Patent
Stephens

(10) Patent No.: US 8,243,753 B2
(45) Date of Patent: *Aug. 14, 2012

(54) DATA DEFINITION APPARATUS, SYSTEMS, AND METHODS

(75) Inventor: Adrian P. Stephens, Cottenham (GB)

(73) Assignee: Intel Corporation, Santa Clara, CA (US)

( * ) Notice: Subject to any disclaimer, the term of this patent is extended or adjusted under 35 U.S.C. 154(b) by 266 days.

This patent is subject to a terminal disclaimer.

(21) Appl. No.: 12/473,424

(22) Filed: May 28, 2009

(65) Prior Publication Data

US 2009/0232157 A1 Sep. 17, 2009

Related U.S. Application Data

(63) Continuation of application No. 10/736,052, filed on Dec. 15, 2003, now Pat. No. 7,583,694.

(51) Int. Cl.
*H04J 3/216* (2006.01)
*H04J 9/00* (2006.01)
*H04L 27/04* (2006.01)

(52) U.S. Cl. ......... 370/465; 370/204; 375/300; 375/320

(58) Field of Classification Search .......... 370/200–469; 375/261–352; 455/67.11, 423, 571, 452.1, 455/450

See application file for complete search history.

(56) References Cited

U.S. PATENT DOCUMENTS

| 6,208,663 | B1 | 3/2001 | Schramm et al. |
| 6,498,808 | B1 | 12/2002 | Tzannes |
| 7,583,694 | B2 * | 9/2009 | Stephens ............... 370/465 |
| 2004/0218627 | A1 | 11/2004 | Kobayashi |
| 2005/0132223 | A1 | 6/2005 | Stephens |

FOREIGN PATENT DOCUMENTS

| EP | 0928084 A2 | 7/1999 |
| EP | 0928084 A2 | 7/1999 |
| WO | WO-0120864 A1 | 3/2001 |
| WO | WO-2005062193 A2 | 7/2005 |
| WO | WO-2005062193 A3 | 7/2005 |

OTHER PUBLICATIONS

"U.S. Appl. No. 10/736,052 Response filed Mar. 2, 2009 to Non-Final Office Action mailed Dec. 2, 2008", 12 pgs.
"U.S. Appl. No. 10/736,052 Response filed Mar. 26, 2008 to Non-Final Office Action mailed Jan. 31, 2008", 11 pgs.
"U.S. Appl. No. 10/736,052 Appeal Brief mailed Aug. 26, 2008", 14 pgs.
"U.S. Appl. No. 10/736,052 Non-Final Office Action mailed on Dec. 2, 2008", 11 pgs.

(Continued)

*Primary Examiner* — Afsar M. Qureshi
(74) *Attorney, Agent, or Firm* — Schwegman, Lundberg & Woessner, P.A.

(57) ABSTRACT

An apparatus and a system, as well as a method and article, may operate to send a selected data type without self-definition information to a receiver if a state capable of interpreting the selected data type has been maintained by the receiver, and to send the selected data type with the self-definition information to the receiver if the state capable of interpreting the selected data type has not been maintained by the receiver.

20 Claims, 3 Drawing Sheets

OTHER PUBLICATIONS

"U.S. Appl. No. 10/736,052 Non-Final Office Action mailed Jan. 31, 2008", 8 pgs.

"U.S. Appl. No. 10/736,052 Notice of Allowance mailed Apr. 30, 2009", 11 pgs.

"International Search Report for corresponding PCT Application PCT/US2004/039237", Jul. 25, 2005, 3 pgs.

"U.S. Appl. No. 10/736,052, Final Office Action mailed Jun. 3, 2008", 11 pgs.

* cited by examiner

DATA DEFINITION APPARATUS, SYSTEMS, AND METHODS

This application is a continuation of U.S. patent application Ser. No. 10/736,052, now issued as U.S. Pat. No. 7,583,694, filed on Dec. 15, 2003, which is incorporated herein by reference in its entirety.

TECHNICAL FIELD

Various embodiments described herein relate to data processing generally, such as apparatus, systems, and methods used to transmit and receive information, including data frames and packets.

BACKGROUND INFORMATION

Some communications protocols may use adaptive modulation (also known as adaptive bit loading), wherein the modulation type can vary by subcarrier. This may occur, for example, with respect to communications using the sub-carriers in various orthogonal frequency-division multiplexing (OFDM) systems. Thus, when adaptively modulated data, which may include packets, is sent to a receiver, a question may arise: Should the modulation used in conjunction with the communication be indicated as well (e.g., should the data be self-defined), or should the data be sent without indicating the modulation type (e.g., should the data be non-self-defined)? Transmitting self-defined data may incur greater on-air overhead. On the other hand, sending non-self-defined data may require several assumptions about the receiver state.

DETAILED DESCRIPTION

Figure 1:
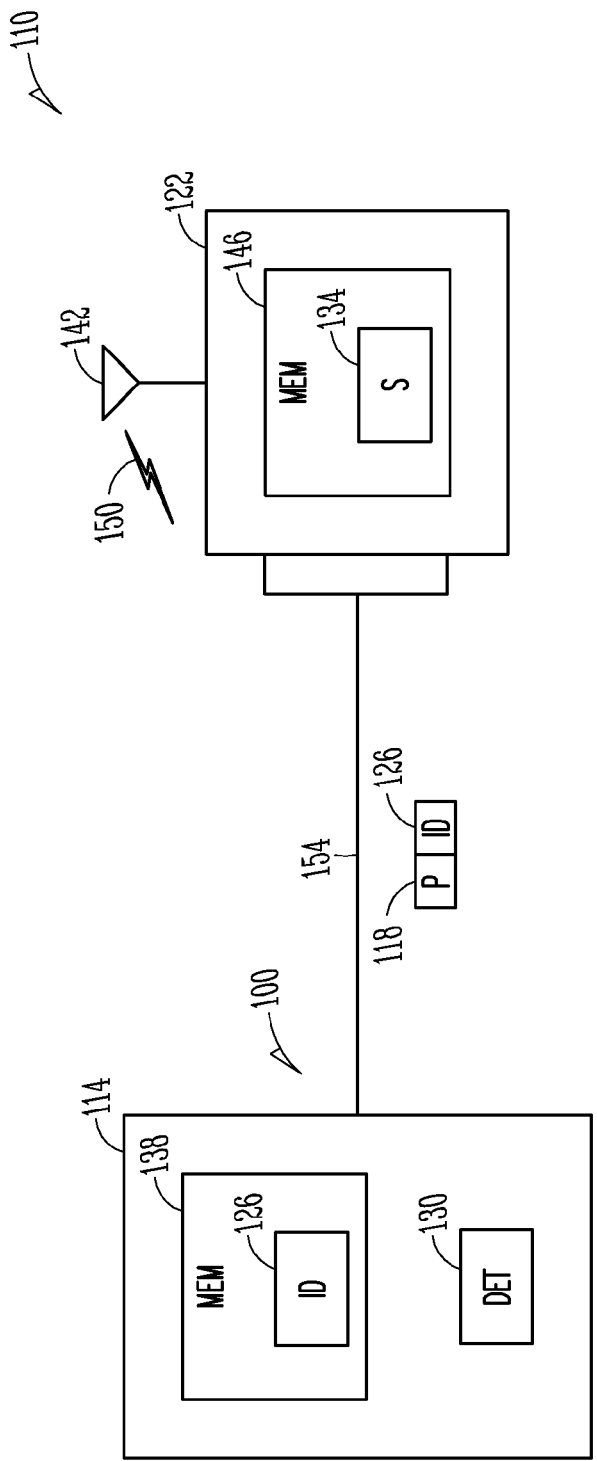
FIG. 1 is a block diagram of an apparatus and a system according to various embodiments.

During the process of communicating information, wireless devices may operate to optimize communications to a wireless channel using a training process, followed by the exchange of frames, all or some of which may be trained to that particular channel (for example, using adaptive modulation or bit loading). The trained frames may be self-defined, such that they can be received without any particular state being maintained by the receiver. The trained frames may also be non-self-defined, such that a receiver may use a state retained from a prior training exchange to receive and properly interpret them.

In various embodiments, a transmitter may select between self-defined and non-self-defined communications according to whether there is reason to believe that the necessary state for reception has been retained at the receiver. Many factors may lead to such belief. For example, the transmitter may determine that:

The transmitter is the only device within a reception range of the receiver.

The receiver and transmitter are the only extant devices having a particular network code, and training depends on a matching network code.

No other transmitters will attempt a training exchange with the receiver, and training depends on a device address.

There has been no opportunity for any other device to communicate with the intended receiver since a training exchange with the transmitter.

For example, in communications using a protocol based on the Institute of Electrical and Electronics Engineers (IEEE) 802.11 protocol, a receiving station may perform training through the exchange of frames with a transmitting station (e.g. a peer-to-peer communication using RTS/CTS with additional training feedback). If it can be determined that this training session is followed by an exchange of trained frames without any opportunity for a third party to gain access to the communications medium or channel, the trained frames may be sent in a non-self-defined format. Thus, in some embodiments using a version of the IEEE 802.11 protocol (e.g., using an RTS/CTS/DATA/DATA/DATA/Block Ack scheme in which each frame is separated by a short gap), no other device may be permitted access to the receiver via the communications medium, except the original training transmitting station, and the data to be communicated may be sent in non-self-defined format. For more information on the various IEEE 802.11 standards, please refer to "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and related versions.

If, however, control of the medium or channel has been yielded to another device after training occurs, then the transmitting station may determine that the state of the receiving station has not been maintained, and any trained frames sent to the receiver thereafter should be sent in a self-defined format. For example, this may happen when the adaptation is updated during a DATA/Ack (with training) exchange followed by a CSMA/CA (Carrier Sense Multiple Access with Collision Avoidance) contention, such that control of the communications channel is lost during a pause that occurs before the next training request. Self-definition information may be sent separately from the associated data, or in close conjunction with the communication, as a part of a packet header for the associated data, for example.

For the purposes of this document, the term "data type" includes any type of communication and/or data associated with a formatting mechanism, such as a multicarrier transmission technique (e.g., orthogonal frequency division multiplexing, or OFDM), a modulation, a code rate or type, such as a forward error correction (FEC) code rate and/or type, the knowledge of which is typically required to decode and interpret the data. A selected data type may be data that is communicated with or without an indication of the formatting mechanism, such that the data is self-defined when an indication of the formatting mechanism is transmitted with the data, and non-self-defined when an indication of the formatting mechanism (e.g., self-definition information) is not transmitted with the data.

For the purposes of this document, "self-defined" or "self-definition" information or data may include an indication, in conjunction with specific information or data, of a formatting mechanism, such as a multicarrier transmission technique, a modulation type, a code rate and/or type, a power, and/or a beamforming parameter, perhaps for use with one or more sub-carriers and/or a multiple-input, multiple-output (MIMO) communications system (wherein multiple antennas and coding can be used to communicate via defined spatial channels, antenna diversity, space-time coding, beamforming, and/or singular value decomposition (SVD) methods, known to those of skill in the art). A "state" maintained by a receiver may mean any information retained by a receiver as a result of a training exchange with a transmitter. The term "transceiver" (e.g., a device including a transmitter and a receiver) may be used in place of either "transmitter" or "receiver" throughout this document.

FIG. 1 is a block diagram of an apparatus 100 and a system 110 according to various embodiments, each of which may operate in the manner described above. For example, an apparatus 100 may comprise a transmitter 114 to selectively send a selected data type 118 to a receiver 122 with or without self-definition information 126. The apparatus 100 may also include a determination module 130 to determine whether a state 134 capable of interpreting the selected data type 118 has been maintained by the receiver 122 after the receiver 122 has been trained to enter the state 134 by the transmitter 114.

The apparatus 100 may also include a memory 138 to store the self-definition information 126. As noted above, the self-definition information 126 may indicate one or more of a multicarrier transmission technique, a modulation, a code rate and/or type, a code, a power, and a beam-forming parameter. The selected data type 118 may be sent to the receiver 122 by the transmitter 114 as a series of frames or packets, including a series of adaptively modulated packets, as well as in other formats.

In another embodiment, a system 110 may comprise an apparatus 100 as described above, as well as a receiver 122 to receive the selected data type 118. The system 110 may further include an antenna 142, such as a patch, omnidirectional, monopole, or dipole antenna capable of being coupled to the receiver. A memory 146 may be included in the receiver 122 to store an indication S of the state 134.

In summary, various embodiments may operate to send data 118 from a transmitter 114 to a receiver 122 using a communications medium, such as a carrier wave 150 and/or a physical connection 154 (e.g., wire, fiber-optics, and others). The data 118 may be sent with self-definition information 126, or not, depending on whether a determination has been made as to whether a particular state 134 has been maintained by the receiver 122. The state 134 may come into existence as a result of an event, such as a training exchange between the transmitter 114 and the receiver 122, as well as via other mechanisms discussed above.

Figure 2:
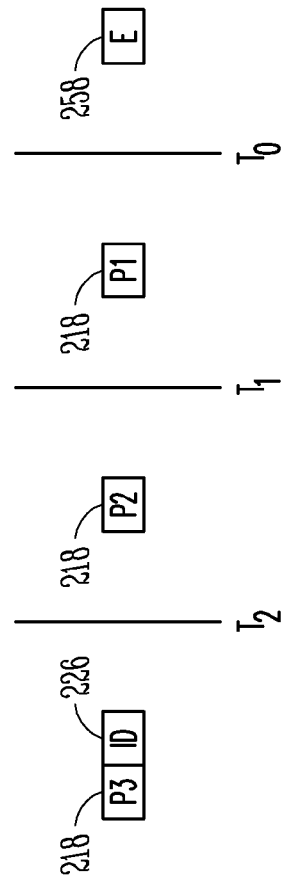
FIG. 2 is a diagram including self-defined and non-self-defined data according to various embodiments.

FIG. 2 is a diagram including self-defined and non-self-defined data according to various embodiments. Referring now to FIGS. 1 and 2, and as noted previously, it can be seen that a state 134 retained by the receiver 122 may come into existence as a result of an event 258, such as a training exchange between a transmitter 114 and a receiver. Thus, after time to, when the event 258 has occurred, a selected data type 118, 218, perhaps in a packet format, may be sent to the receiver 122 without self-definition information 126, 226. However, after the passage of times $t_1$ and $t_2$, or whenever it is determined that the state 134 of the receiver 122 (sufficient to receive and properly interpret the selected data type 118, 218) has not been maintained, the selected data type 118, 218 may be sent with self-definition information 126, 226.

The apparatus 100, system 110, transmitter 114, selected data type 118, 218, receiver 122, self-definition information 126, 226, determination module 130, state 134, memories 138, 146, antenna 142, carrier wave 150, physical connection 154, event 258, and indication S of the state 134 may all be characterized as "modules" herein. Such modules may include hardware circuitry, and/or one or more processors and/or memory circuits, software program modules, including objects and collections of objects, and/or firmware, and combinations thereof, as desired by the architect of the apparatus 100 and the system 110, and as appropriate for particular implementations of various embodiments.

It should also be understood that the apparatus and systems of various embodiments can be used in applications other than transmitters and receivers, and other than for wireless systems, and thus, various embodiments are not to be so limited. The illustrations of an apparatus 100 and a system 110 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, cellular telephones, personal computers, personal digital assistants (PDAs), workstations, radios, video players, vehicles, and others.

Figure 3:
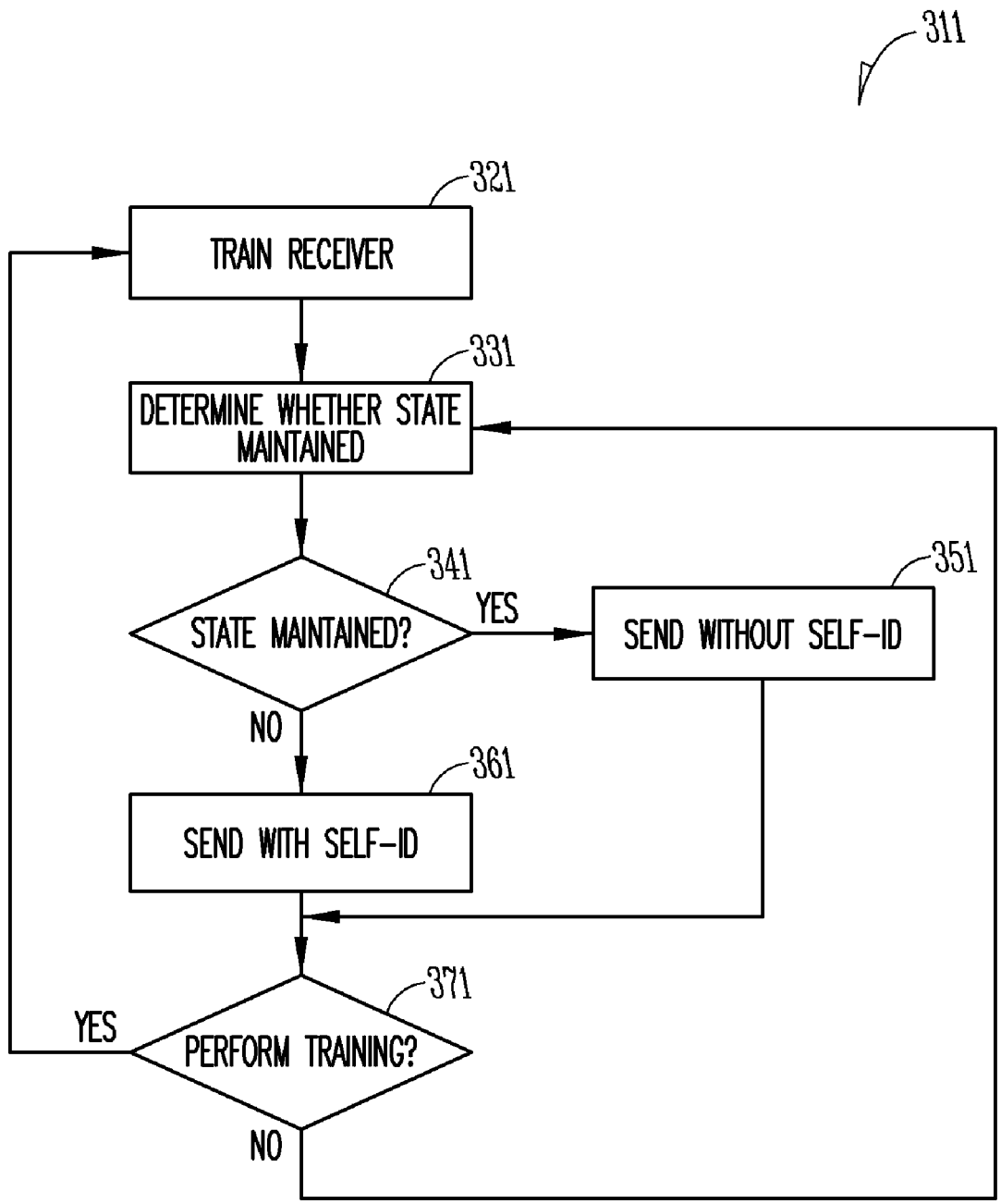
FIG. 3 is a flow chart illustrating several methods according to various embodiments.

FIG. 3 is a flow chart illustrating several methods according to various embodiments. A method 311 may (optionally) begin with training a receiver to enter a state capable of interpreting a selected data type at block 321. The method 311 may include determining whether a state capable of interpreting a selected data type has been maintained by the receiver at block 331.

If it is determined that the desired state has been maintained by the receiver at block 341, then the method 311 may include sending the selected data type without self-definition information to the receiver at block 351. If it is determined that the state has not been maintained by the receiver at block 341, then the method 311 may include sending the selected data type with the self-definition information to the receiver at block 361. In either case, the method 311 may then continue with determining whether new and/or additional training should be performed at block 371, perhaps on the basis of a selected amount of time passing since training was last performed, and/or other factors. If training is to be performed, the method 311 may continue with training the receiver at block 321. If training is not needed, as determined at block 371, then the method 311 may continue with determining, perhaps at a selected future time, whether the state has been maintained by the receiver at block 331.

There are numerous ways in which a determination can be made as to whether the state capable of interpreting the selected data type has been maintained by the receiver. For example, determining whether the state has been maintained by the receiver may include determining that the receiver has not received a communication from another transmitter after being trained to enter the state by the training transmitter. In another case, determining whether the state has been maintained by the receiver may include determining that no transmitter (or other device) other than the training transmitter is capable of communicating with the receiver. Still further, determining whether the state has been maintained by the receiver may include determining whether a transmission of information from a transmitter (or other device) other than the training transmitter has been directed to the receiver.

Other ways to determine whether the state has been maintained by the receiver are possible. For example, determining whether the state has been maintained by the receiver may include determining that the receiver is operating in accordance with a protocol that prohibits communication with a transmitter (or other device) other than the training transmitter. In some embodiments, the protocol may prohibit reception from any other device by the receiver until the training transmitter indicates that a communication session between the training transmitter and the receiver is terminated. In some embodiments, the protocol may be an Institute of Electrical and Electronics Engineers (IEEE) 802.11 protocol.

Still other mechanisms for determining whether the state has been maintained by the receiver may be used. For example, determining whether the state has been maintained by the receiver may include determining, by an access point, that no information will be communicated to the receiver except by the access point. Determining whether the state has been maintained by the receiver may also include determining that control of a communications channel in use by the receiver and the training transmitter has not been released by the training transmitter.

As noted previously, the self-definition information may be included in frames (e.g., byte-oriented framing, bit-oriented framing, and/or clock-based framing) and/or packets (e.g., a unit of data transmitted across a packet-switched network), including in a packet header. The self-definition information may indicate one or more of a multicarrier transmission technique, a modulation, a code rate or type, a power, and a beam-forming parameter.

It should be noted that the methods described herein do not have to be executed in the order described, or in any particular order. Moreover, various activities described with respect to the methods identified herein can be executed in serial or parallel fashion. For the purposes of this document, the terms "information" and "data" may be used interchangeably. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java, Smalltalk, or C++. Alternatively, the programs can be structured in a procedure-orientated format using a procedural language, such as assembly or C. The software components may communicate using any of a number of mechanisms well-known to those skilled in the art, such as application program interfaces or inter-process communication techniques, including remote procedure calls. The teachings of various embodiments are not limited to any particular programming language or environment, including Hypertext Markup Language (HTML) and Extensible Markup Language (XML). Thus, other embodiments may be realized, as shown in FIG. 4.

Figure 4:
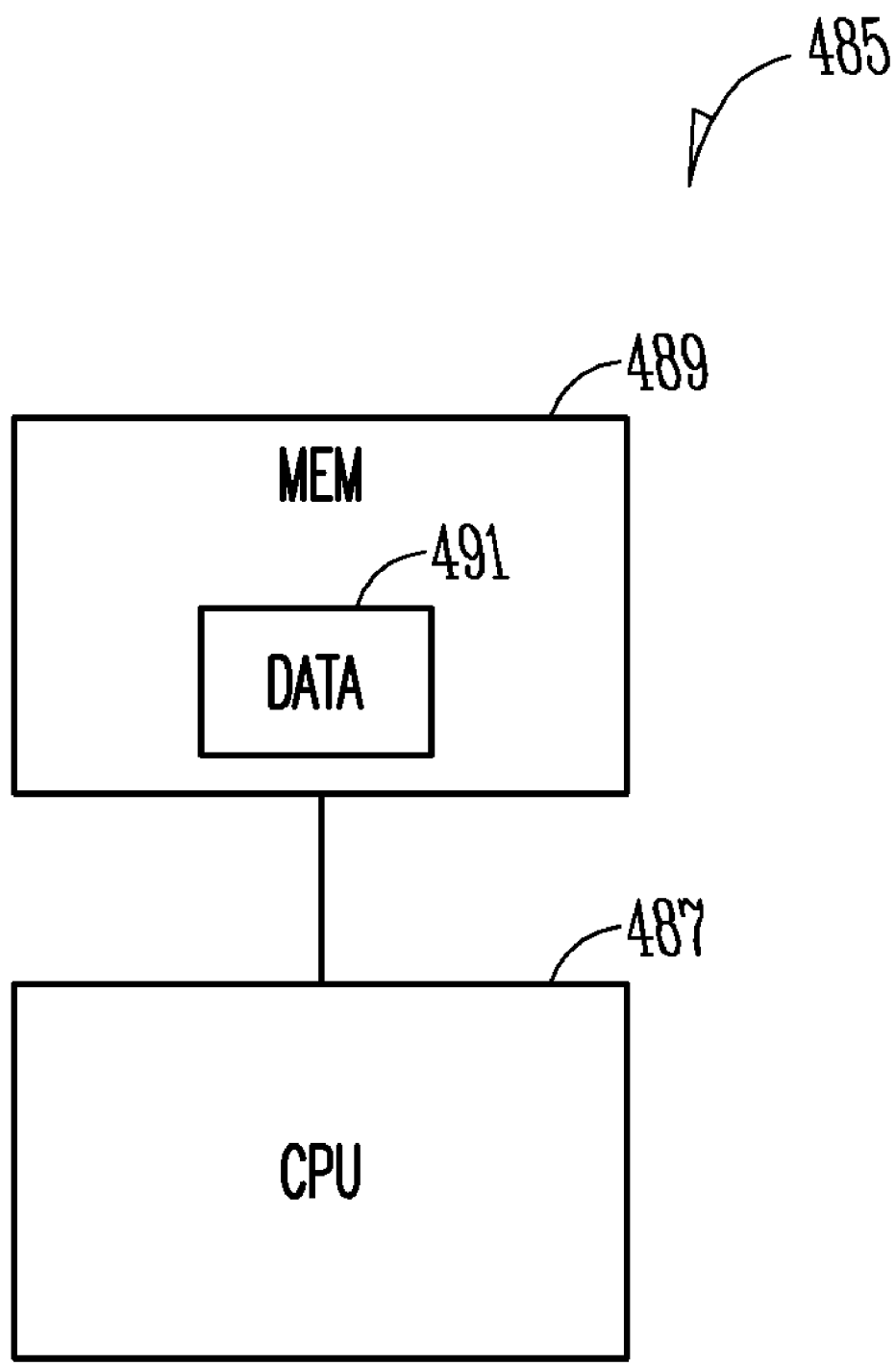
FIG. 4 is a block diagram of an article according to various embodiments.

FIG. 4 is a block diagram of an article 485 according to various embodiments, such as a computer, a memory system, a magnetic or optical disk, some other storage device, and/or any type of electronic device or system. The article 485 may comprise a processor 487 coupled to a machine-accessible medium such as a memory 489 (e.g., a memory including an electrical, optical, or electromagnetic conductor) having associated information 491 (e.g., computer program instructions, and/or other data), which when accessed, results in a machine (e.g., the processor 487) performing such actions as sending a selected data type without self-definition information to a receiver if a state capable of interpreting the selected data type has been maintained by the receiver, and sending the selected data type with the self-definition information to the receiver if the state capable of interpreting the selected data type has not been maintained by the receiver.

Other actions may include determining whether the state capable of interpreting the selected data type has been maintained by the receiver. As noted above, determining whether the state has been maintained by the receiver may include determining, by an access point, that no information will be communicated to the receiver except by the access point, as well as determining that control of a communications channel used by the receiver and a training transmitter has not been released by the training transmitter.

Implementing the apparatus, systems, and methods described herein may result in reducing the overhead used to transmit self-definition information in conjunction with data for a variety of communication systems. This may in turn provide improved bandwidth utilization and reduced communication costs.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
   determining by a transmitter whether a state capable of interpreting a selected data type has been maintained by a receiver by determining whether a transmission of information from a non-training transmitter has been directed to the receiver;
   sending the selected data type without self-definition information from the transmitter to the receiver if the state capable of interpreting the selected data type has been maintained by the receiver; and sending the selected data type with the self-definition information from the transmitter to the receiver if the state capable of interpreting the selected data type has not been maintained by the receiver.

2. The method of claim 1, further comprising:
training the receiver to enter the state capable of interpreting the selected data type.

3. The method of claim 1, wherein determining whether the state capable of interpreting the selected data type has been maintained by the receiver further comprises:
determining that the receiver has not received a communication from another transmitter after the receiver has been trained to enter the state capable of interpreting the selected data type by a training transmitter.

4. The method of claim 1, wherein determining whether the state capable of interpreting the selected data type has been maintained by the receiver further comprises:
determining that no transmitter other than a training transmitter is capable of communicating with the receiver.

5. The method of claim 1, wherein determining whether the state capable of interpreting the selected data type has been maintained by the receiver further comprises:
determining that the receiver is operating in accordance with a protocol that prohibits communication with the non-training transmitter until a training transmitter indicates that a communication session between the training transmitter and the receiver is terminated.

6. The method of claim 1, wherein determining whether the state capable of interpreting the selected data type has been maintained by the receiver further comprises:
determining that control of a communications channel used by the receiver and a training transmitter has not been released by the training transmitter.

7. The method of claim 1, wherein the protocol is an Institute of Electrical and Electronics Engineers (IEEE) 802.11 protocol.

8. The method of claim 1, wherein the self-definition information is included in a packet header.

9. The method of claim 1, wherein the self-definition information indicates at least one of a multicarrier transmission technique, a modulation, a code rate, a code type, a power, and a beam-forming parameter.

10. An article comprising a non-transitory computer readable medium having associated instructions, wherein the instructions, when executed, result in a machine performing:
determining by a transmitter whether a state capable of interpreting a selected data type has been maintained by a receiver by determining whether a transmission of information from a non-training transmitter has been directed to the receiver;
sending the selected data type without self-definition information from the transmitter to the receiver if the state capable of interpreting the selected data type has been maintained by the receiver; and
sending the selected data type with the self-definition information from the transmitter to the receiver if the state capable of interpreting the selected data type has not been maintained by the receiver.

11. The article of claim 9, wherein determining whether the state capable of interpreting the selected data type has been maintained by the receiver further comprises:
determining, by an access point, that no information will be communicated to the receiver except by the access point.

12. The article of claim 9, wherein determining whether the state capable of interpreting the selected data type has been maintained by the receiver further comprises:
determining that control of a communications channel used by the receiver and a training transmitter has not been released by the training transmitter.

13. An apparatus, comprising:
a transmitter to selectively send a selected data type to a receiver with or without self-definition information; and
a determination module included in the transmitter to determine whether a state capable of interpreting the selected data type has been maintained by the receiver after the receiver has been trained to enter the state by the transmitter by determining whether a transmission of information from a non-training transmitter has been directed to the receiver.

14. The apparatus of claim 13, further comprising:
a memory to store the self-definition information.

15. The apparatus of claim 13, wherein the self-definition information indicates at least one of a multicarrier transmission technique, a modulation, a code rate, a code type, a power, and a beam-forming parameter.

16. The apparatus of claim 13, wherein the selected data type is sent to the receiver by the transmitter as a series of frames.

17. A system, comprising:
a transmitter to selectively send a selected data type with or without self-definition information;
a receiver to receive the selected data type; and
a determination module included in the transmitter to determine whether a state capable of interpreting a selected data type to be sent by the transmitter has been maintained by the receiver after the receiver has been trained to enter the state by the transmitter by determining whether a transmission of information from a non-training transmitter has been directed to the receiver.

18. The system of claim 17, further comprising:
an omnidirectional antenna capable of being coupled to the receiver.

19. The system of claim 17, further comprising:
a memory included in the receiver to store an indication of the state.

20. The system of claim 17, wherein the selected data type is sent to the receiver by the transmitter as a series of adaptively modulated packets.

* * * * *

UNITED STATES PATENT AND TRADEMARK OFFICE
CERTIFICATE OF CORRECTION

PATENT NO.        : 8,243,753 B2
APPLICATION NO.   : 12/473424
DATED             : August 14, 2012
INVENTOR(S)       : Adrian P. Stephens It is certified that error appears in the above-identified patent and that said Letters Patent is hereby corrected as shown below:

In the Claims

In column 8, line 23, in claim 13, after "transmitter", insert --,--, therefor

In column 8, line 43, in claim 17, after "transmitter", insert --,--, therefor

Signed and Sealed this
Eighteenth Day of November, 2014

Michelle K. Lee
*Deputy Director of the United States Patent and Trademark Office*